(No Model.)

J. FITZGERALD & D. L. OSBORN.
WHEELED DIRT SCRAPER.

No. 360,007. Patented Mar. 29, 1887.

Witnesses
Thomson Cross
William Cruzenberry

Inventor
John Fitzgerald and
David L. Osborn.
By their Attorneys
Hamilton & Treavitt.

United States Patent Office.

JOHN FITZGERALD AND DAVID L. OSBORN, OF LINCOLN, NEBRASKA.

WHEELED DIRT-SCRAPER.

SPECIFICATION forming part of Letters Patent No. 360,007, dated March 29, 1887.

Application filed January 6, 1887. Serial No. 223,565. (No model.)

*To all whom it may concern:*

Be it known that we, JOHN FITZGERALD and DAVID L. OSBORN, citizens of the United States, residing at Lincoln, in the county of Lancaster and State of Nebraska, have invented certain new and useful Improvements in Wheeled Dirt-Scrapers; and we do hereby declare the following to be a full, clear, and exact description of the invention, such as will enable others skilled in the art to which it appertains to make and use the same.

Our invention relates to wheeled dirt scrapers or excavators for excavating, grading, or moving dirt, earth, sand, gravel, or other material short distances by means of scooping the same up and then raising the same clear or free of the ground when being transported; and the objects of our improvement are to provide a dirt scraper or excavator which can be regulated so as to cut and fill light or deep, as may be desired, and which can be operated at a less expenditure of time and power than is required in other dirt-scrapers heretofore known and used, and at the same time to provide means whereby the scoop can be prevented from dumping while being loaded and filled. We attain these objects by means of the following mechanism, illustrated in the accompanying drawings, in which—

Figure 1:
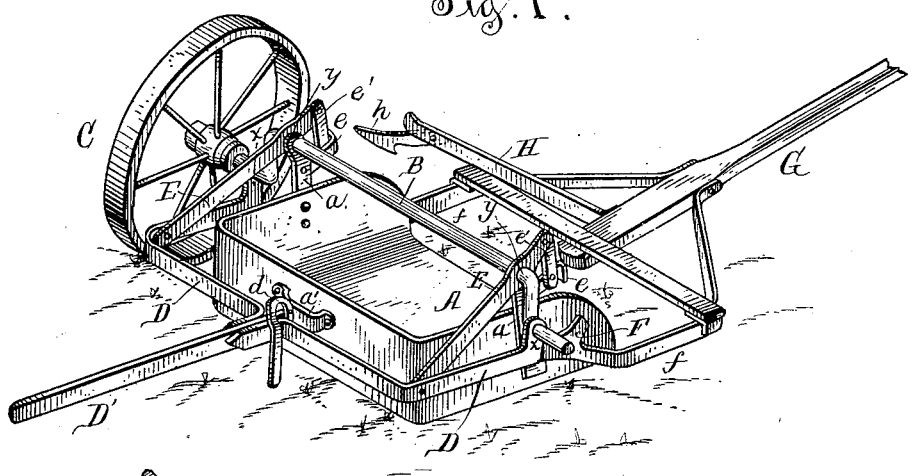
Figure 2:
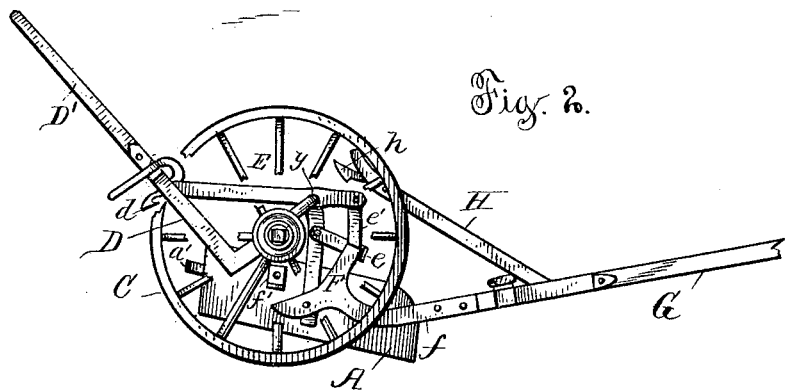
Figure 3:
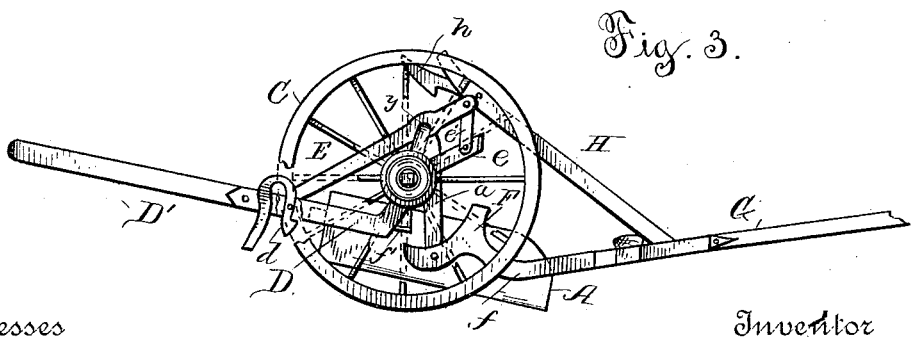

Figure 1 is a side and rear view in perspective of our invention, having one of the wheels thereof removed. Fig. 2 is a side view of our invention in position for filling the scoop, and Fig. 3 is a side view of our invention in position for dumping.

Similar letters refer to similar parts throughout the several views.

A represents a scoop of ordinary construction for holding dirt or material. The scoop A is mounted or hung on the cranked axle B by means of hangers or ears $a$ $a$, which are fastened or secured to the scoop A, and which allow the scoop A to swing, move, and oscillate upon the axle B, as may be desired by the operator, in loading, raising, and dumping the same.

The cranked axle B is supported at its ends by two wheels, C C, arranged and secured to turn on the spindles of the axle.

The letter D represents the lever that controls, governs, and adjusts the scoop while being loaded, raised, or dumped. This lever D is secured to the axle B at $x$. From this point of connection with the axle B the lever D projects downward a suitable distance, and is then projected back and around the outside of the scoop from each axle, and at a point back of the center of the scoop continues back, and thereby forms a lever-handle, D', of sufficient length of leverage to enable one man to raise the scoop and control its operations. Attached to the lever or lever-handle is a dog or catch, $d$, designed to engage an ear, $a'$, upon the scoop A.

The letter E represents a brace or connection from the lever or bail D to the axle B. One end of the brace E is fastened to the lever or bail D at the point where the lever turns on the outside of the scoop A, and passes parallel to the axle B. At the point $y$ this brace is connected with the axle B, the brace E being provided with an opening, through which the axle passes.

The object of this device is to obtain a greater leverage in raising the scoop when loaded, as by means of this device the lever draws and lifts directly upon the ears or hangers $a$ $a$ of the scoop by drawing back the axle B, and the fulcrum being shortened in proportion as the scoop is raised, the leverage-power is thereby increased.

Secured to the hangers or ears $a$ $a$ of the scoop A is a latch, $e$, which is also connected, by means of the bar $e'$, to the forward end of the brace E. When the lever D is raised, the free end of the latch $e$ is lowered, and is designed to travel and come to a rest upon the upper and curved portion of the plate F, and forms a lock which holds the scoop in a firm position, and prevents the same from being dumped while being loaded or filled.

The plate F is secured on the draw-bar $f$ from the tongue G. Fastened to the side of the scoop A, above the rear end of the plate F, is a stop, $f'$, against which the rear end of the plate F presses when the scoop is raised to its ordinary draft-level, and which thus prevents the scoop, when loaded, from tilting backward, and also prevents the tongue G from dropping below a desired level.

The letter H represents a bar secured at one end to the tongue G. The other end of the bar H is provided with a clutch, $h$, designed to engage the lever D when the scoop is dumped, and holds the scoop firmly while being transported to the place of filling.

The operation of our invention is as follows: The scoop A is dropped for grading by the operator taking hold of the handle D', and at the same time disengaging the dog or clutch $d$ from the ear $a'$ and raising the lever. The higher the lever D is raised the deeper the scoop will cut. When the scoop is full the lever is drawn downward, thereby raising the scoop, which, when raised, is held firmly in position by means of the clutch $d$ engaging the ear $a'$. In this position the scoop is transported to the dump. There the lever is again raised by the operator, the clutch $d$ still being engaged with the ear $a'$. As soon as the point of the scoop touches the ground, the forward movement of the team turns the scoop over far enough to allow the contents of the scoop to be discharged, and the clutch $h$ of the bar H engages the lever D, and thus prevents the scoop from tilting back until released by the operator.

Having thus described our invention, we claim as new and desire to secure by Letters Patent—

1. In a wheeled dirt-scraper, the combination of the cranked axle B, hangers $a$, scoop A, provided with ear $a'$, lever D, clutch $d$, lever-handle D', and brace E, connecting the lever and axle, substantially as described.

2. The combination of the scoop A, latch $e$, connected with the cranked axle B, and the plate F, attached to the draw-bars $f$ of the tongue G, substantially as described.

3. In a wheeled dirt-scraper, the combination of the cranked axle B, hangers $a$, scoop A, lever D, handle D', clutch $d$, ear $a'$, latch $e$, connected with the cranked axle B, stop $f'$, plate F, attached to draw-bar $f$, and tongue G, substantially as described.

4. In a wheeled dirt-scraper, the combination of the cranked axle B, hanger $a$, scoop A, lever D, handle D', clutch $d$, ear $a'$, brace E, bar $e'$, latch $e$, plate F, stop $f'$, draw-bar $f$, and tongue G, substantially as described.

5. In a wheeled dirt-scraper, the combination of the cranked axle B, hanger $a$, scoop A, lever D, handle D', clutch $d$, ear $a'$, brace E, bar $e'$, latch $e$, plate F, stop $f'$, draw-bar $f$, tongue G, bar H, and catch $h$, substantially as described.

In testimony whereof we affix our signatures in presence of two witnesses.

JOHN FITZGERALD.
DAVID L. OSBORN.

Witnesses:
C. S. TREVITT,
J. T. MULLOR.